United States Patent [19]

Faulstich et al.

[11] 4,066,464

[45] Jan. 3, 1978

[54] OPTICAL GLASSES WITH IMPROVED VARYING PARTIAL DISPERSION IN THE OPTICAL POSITIONAL RANGE OF LANTHANUM CROWN GLASSES AND LANTHANUM FLINT GLASSES

[75] Inventors: Marga Faulstich, Mainz; Walter Geffcken, Mainz-Gonsenheim, both of Germany

[73] Assignee: Jenaer Glaswerk Schott & Gen., Mainz, Germany

[21] Appl. No.: 656,900

[22] Filed: Feb. 10, 1976

Related U.S. Application Data

[63] Continuation of Ser. No. 402,805, Oct. 2, 1973, abandoned.

[30] Foreign Application Priority Data

Oct. 2, 1972 Germany .............................. 2248255

[51] Int. Cl.$^2$ ......................... C03C 3/08; C03C 3/04; C03C 3/30
[52] U.S. Cl. ..................................... 106/47 Q; 106/54
[58] Field of Search ................................ 106/47 Q, 54

[56] References Cited

U.S. PATENT DOCUMENTS

| 3,716,385 | 2/1973 | Ritzi ................................ 106/47 Q |
| 3,740,242 | 6/1973 | Faulstich et al. .................. 106/47 Q |

FOREIGN PATENT DOCUMENTS

| 4,524,458 | 8/1970 | Japan ...................................... 106/54 |
| 7,010,221 | 1/1971 | Netherlands ......................... 106/47 Q |
| 55,355 | 10/1943 | Netherlands ............................ 106/54 |

*Primary Examiner*—Winston A. Douglas
*Assistant Examiner*—Mark Bell
*Attorney, Agent, or Firm*—Schwartz & Weinrieb

[57] ABSTRACT

Optical, fluorine containing barium borosilicate glasses having an improved varying partial dispersion in the optical positional range of lanthanum crown and lanthanum flint glasses wherein the ratio of $SiO_2$ with respect to $SiO_2$ and $B_2O_3$ is at least 0.62 and the content of fluorine in said glass is between 2 and 7 grams per 100 cc of said glass.

12 Claims, 2 Drawing Figures

OPTICAL GLASSES WITH IMPROVED VARYING PARTIAL DISPERSION IN THE OPTICAL POSITIONAL RANGE OF LANTHANUM CROWN GLASSES AND LANTHANUM FLINT GLASSES

This is a continuation of application Ser. No. 402,805, filed Oct. 2, 1973, now abandoned.

BACKGROUND OF THE INVENTION

This invention relates to a novel class of optical glasses, and more particularly, to such glasses which exhibit good stability with respect to changes in climatic conditions, low staining susceptibility and can be ground, polished and pressed like ordinary silicate glasses. These glasses have the same optical position as lanthanum crown glasses (LaC) and lanthanum flint glasses (LaF), but exhibit a higher partial dispersion $P_{g,F}$ than prior glasses.

Normal commercial glasses, in the optical positional range of the LaC and LaF glasses, have a partial dispersion $P_{g,F} = (n_g - n_F)/n_F - n_C)$ which is considerably reduced, by comparison, with the normal partial dispersion, as calculated from the Abbe equation $$P_{g,F} = 0.6438 - 0.001682\nu_d$$

and set forth, for example, in the Jenaer Glaswerk Schott & Gen. catalogue for optical glass no. 3050/1966/II 5.

Prior art glasses within the optical positional range of LaC and LaF glasses are characterized by the passage of a straight line through each of the following limiting values (as illustrated in FIG. 1):

| | | |
|---|---|---|
| $n_d = 1.642$ | $\nu_d = 58.0$ to $n_d = 1.699$ | $\nu_d = 46.0$ |
| $n_d = 1.642$ | $\nu_d = 58.0$ to $n_d = 1.652$ | $\nu_d = 58.5$ |
| $n_d = 1.652$ | $\nu_d = 58.5$ to $n_d = 1.702$ | $\nu_d = 54.6$ |
| $n_d = 1.702$ | $\nu_d = 54.6$ to $n_d = 1.742$ | $\nu_d = 44.0$ |
| $n_d = 1.742$ | $\nu_d = 44.0$ to $n_d = 1.699$ | $\nu_d = 46.0$ |

Each of these prior art glasses exhibit particularly low $P_{g,F}$ values.

Glasses having the lowest $P_{g,F}$ values and most extreme optical positions (e.g. $n_d=1.697$; $\nu_d=55.4$) consist essentially of $B_2O_3$, CaO, $La_2O_3$, $ZrO_2$ and less than 10 percent by weight of $SiO_2$. In addition to these ingredients, these glasses can also contain MgO, SrO, PbO, ZnO, CdO, $TiO_2$, $Al_2O_3$, $Nb_2O_5$, and $WO_3$ for varying the $n_d$ and $\nu_d$ values and for improving the crystallization stability and chemical resistivity of the glasses.

In prior art glasses, when the $SiO_2$ content was raised to above 10 percent by weight, with a corresponding reduction in the amount of $B_2O_3$ present, the optical positional range became smaller and hence an increase in the crystallization tendency and a lowering of the $\nu_d$ value with a given $n_d$ value of the glass occurred. One attempt to avoid the tendency of the glass to crystallize was to partially replace CaO and $La_2O_3$ with BaO and $ThO_2$, respectively. However, this attempt was not successful because the $\nu_d$ was considerably low and the $P_{g,F}$ values were also considerably below the aforementioned normal partial dispersion value. A need therefore has existed for optical glasses having the same optical position as LaC and LaF glasses but with higher partial dispersion $P_{g,F}$ than prior known glasses of the same optical position.

OBJECTS OF THE INVENTION

It is therefore a significant object of this invention to provide optical glasses having an improved varying partial dispersion in the optical positional range of lanthanum crown glasses and lanthanum flint glasses.

Another object of this invention is to provide optical glasses having a very good stability with respect to changes in climatic conditions.

Still another object of this invention is the provision of optical glass that can be ground, polished and pressed like ordinary silicate glasses.

It is a further object of this invention to provide optical glasses which exhibit a low susceptibility to staining.

A still further object of this invention is the provision of a composition for the production of optical glasses having an enlarged optical glass range without having the drawback of an appreciable reduction in the $P_{g,F}$ value.

BRIEF SUMMARY OF THE INVENTION

Briefly, the invention relates to optical glasses containing barium borosilicate and having a varying partial dispersion $P_{g,F}[(n_g - n_f)/(n_F - n_C)]$ in the optical positional range of LaC and LaF glasses wherein the amount of $SiO_2$ present in the glass satisfies the following condition:

$$\frac{[Si_1O]}{[Si_1O] + [B_1O]}$$

is at least 0.62 and the content of fluorine is at least 7 grams per 100 cc of glass.

DETAILED DESCRIPTION OF THE INVENTION

Figure 1:
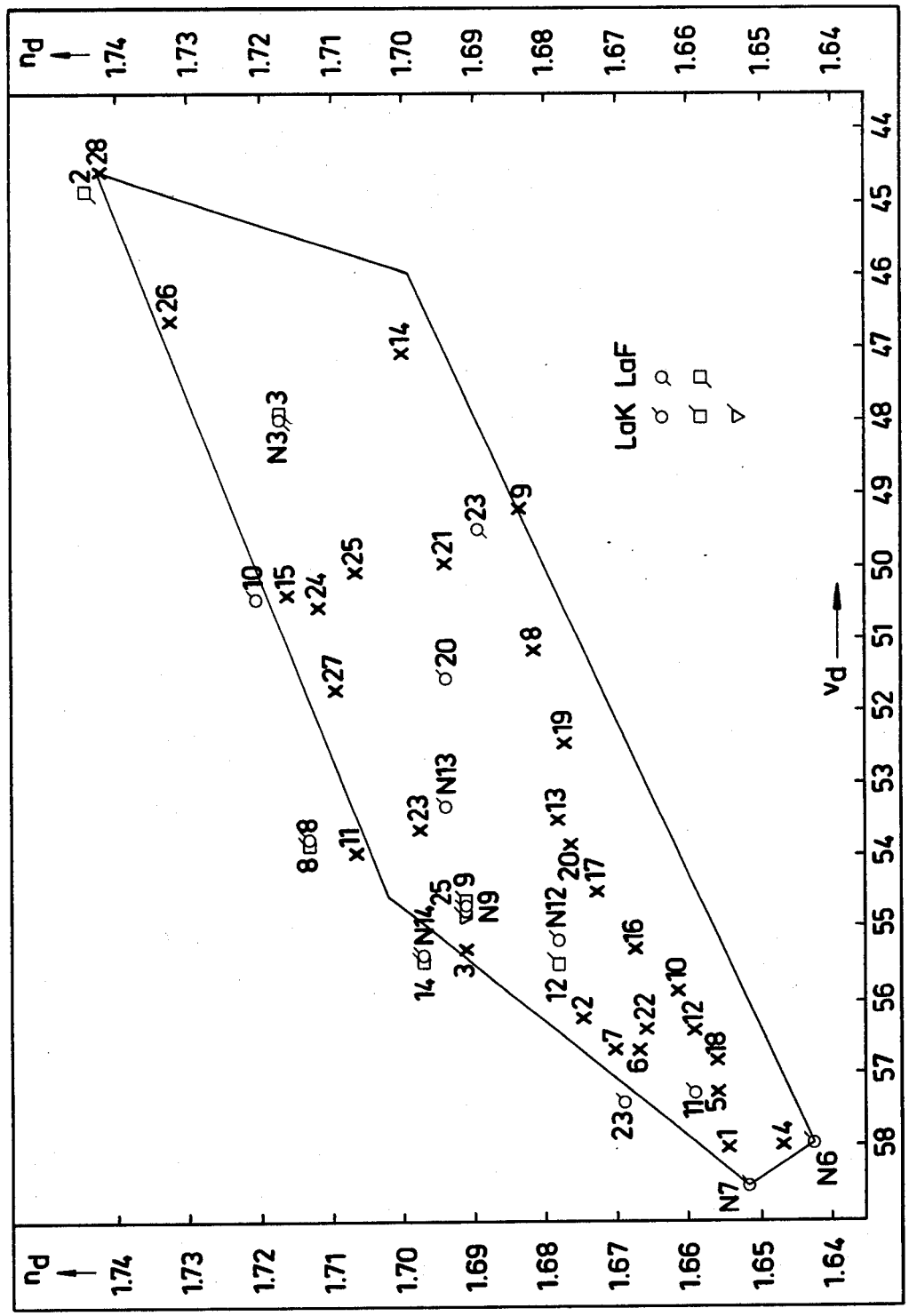

The compositions of the glasses according to the invention consist essentially of the following materials:

| Oxide | % by wt. | or | Oxides | Equivalent % | |
|---|---|---|---|---|---|
| $SiO_2$ | 20–26 | 26–31 | $Si_1O$ | 42–53 | 60–66 |
| $B_2O_3$ | 2–8.0 | | $B_1O$ | 5–20 | |
| BaO | 20–38 | 25–40 | BaO | 9–18 | 10–22 |
| MgO | 0–6 | | MgO | 0–5 | |
| CaO | 0–18 | | CaO | 0–10 | |
| SrO | 0–18 | | SrO | 0–10 | |
| $Ba_2O_3$ | 20–32 | 20–32 | $Ba_1O$ | 10–20 | 10–23 |
| $Y_2O_3$ | 0–25 | | $Y_1O$ | 0–20 | |
| $ThO_2$ | 0–18 | | $Th_1O$ | 0–12 | |

The above compositions further comprise at least 2 weight percent or 5 equivalent percent and preferably from 2 to 7 weight or 5 to 20 equivalent percent of $F_2$-O. Thus, in a fictitious purely oxidic glass of the above composition range, so much oxygen is to be replaced by 2 fluorine atoms that the increased weight amounts to 2 to 7 grams per 100 grams of oxidic glass. In an analagous manner, $F_2$-O is from 5 to 20 equivalent percent which means that 5 to 20 percent of the oxygen are replaced by an equivalent amount of fluorine.

The fluorine content of the glass can be introduced into each compound which is normally employed in the glass-melting art. For example, the fluorine can be introduced by using such compounds as $BaF_2$, $LaF_2$, $ThF_4$, $BaSiF_6$, etc.

In order to adjust the required $n_d$ and $v_d$ values, up to 12 equivalent percent of one or more of the following ingredients can be used:

divalent components, e.g., ZnO, PbO and CdO;
tetravalent components, e.g., TiO$_2$ and ZrO$_2$;
pentavalent components, e.g., Nb$_2$O$_5$ and Ta$_2$O$_5$; and
hexavalent components, e.g., WO$_3$ and MO$_3$.

The total content of the above-identified highly refracting, weakly or moderately dispersing constituents including La$_2$O$_3$, ThO$_2$, BaO, SrO, CaO, ZnO, Ta$_2$O$_5$, Nb$_2$O$_5$ and ZrO$_2$, is to amount to at least 29 equivalent percent or 60 weight percent, Y$_2$O$_3$ can be used as a substitute for La$_2$O$_3$, either is whole or in part. Preferably, up to 25 percent by weight of La$_2$O$_3$ are replaced by Y$_2$O$_3$.

Similarly, in order to adjust the required optical positions and improve the crystallization stability of the optical glasses of this invention having the components BaO, La$_2$O$_3$ and ThO$_2$, portions of the latter components can be replaced by one or more of the following highly refracting, weakly or moderately dispersing components:

|  | weight percent |
|---|---|
| CaO | 0 – 18 |
| SrO | 0 – 18 |
| ZnO | 0 – 10 |
| Y$_2$O$_3$ | 0 – 25 |
| ZrO$_2$ | 0 – 7 |
| Ta$_2$O$_5$ | 0 – 12 |
| Nb$_2$O$_5$ | 0 – 12 |

When more strongly dispersing components, e.g., MgO, PbO, CdO, Al$_2$O$_3$, TiO$_2$ and WO$_3$, are added to the glasses in order to adjust a required optical position and for crystallization stability, generally up to 8 equivalent percent is utilized.

From 0 to 2 equivalent percent of As$_2$O$_3$, Sb$_2$O$_3$, NaCl, NH$_4$NO$_3$, alkali silicofluorides, etc. can be used as refining agents in the practice of this invention. A preferred refining agent is As$_2$O$_3$ which is preferably used in an amount of 0.3 weight percent of the total composition.

Represented in Tables 1 and 2 are examples of the optical glasses in accordance with the invention. The various ingredients are set forth in terms of percentage by weight as well as equivalent percent.

TABLE 1

[Compositions in Equivalent Percent]

|  | 1 | 2 | 3 | 4 | 5 | 6 | 7 | 8 | 9 | 10 |
|---|---|---|---|---|---|---|---|---|---|---|
| Si$_{1/2}$O | 50.8 | 50.2 | 44.2 | 49.4 | 50.2 | 51.6 | 50.6 | 50.8 | 51.3 | 50.1 |
| B$_{2/3}$O | 14.6 | 14.4 | 19.3 | 14.3 | 14.4 | 14.9 | 14.5 | 14.5 | 14.6 | 14.2 |
| MgO | — | — | — | 3.1 | — | — | — | — | — | — |
| CaO | — | — | — | — | — | — | — | — | — | — |
| SrO | — | — | — | — | 3.5 | — | — | — | — | — |
| BaO | 15.3 | 13.4 | 10.9 | 14.3 | 12.9 | 13.1 | 14.0 | 15.4 | 14.7 | 13.6 |
| PbO | — | — | — | — | — | — | — | 2.0 | 3.2 | — |
| ZnO | — | — | — | — | — | — | — | — | — | 5.1 |
| CaO | — | — | — | — | — | — | — | — | — | — |
| La$_{2/3}$O | 16.2 | 16.9 | 18.3 | 15.9 | 16.0 | 15.2 | 13.8 | 14.2 | 13.1 | 14.0 |
| Y$_{2/3}$O | — | — | — | — | — | — | — | — | — | — |
| Al$_{2/3}$O | — | — | — | — | — | — | — | — | — | — |
| Zr$_{1/2}$O | — | — | — | — | — | — | — | — | — | — |
| Ti$_{1/2}$O | — | — | — | — | — | — | — | — | — | — |
| Tb$_{1/2}$O | 3.1 | 5.1 | 7.3 | 3.0 | 3.0 | 5.2 | 7.1 | 3.1 | 3.1 | 3.0 |
| Nb$_{2/5}$O | — | — | — | — | — | — | — | — | — | — |
| Ta$_{2/5}$O | — | — | — | — | — | — | — | — | — | — |
| W$_{1/3}$O | — | — | — | — | — | — | — | — | — | — |
| total | 100.0 | 100.0 | 100.0 | 100.0 | 100.0 | 100.0 | 100.0 | 100.0 | 100.0 | 100.0 |
| F$_2$–O | 15.3 | 13.4 | 10.9 | 15.2 | 15.5 | 13.1 | 14.1 | 9.3 | 9.4 | 9.3 |
| As$_2$O$_3$ (refining agent) | 0.3 | 0.3 | 0.3 | 0.3 | 0.3 | 0.3 | 0.3 | 0.3 | 0.3 | 0.3 |
| $\frac{Si_{1/2}O}{(Si_{1/2}O) + (B_{2/3}O)}$ | 0.78 | 0.78 | 0.70 | 0.77 | 0.78 | 0.77 | 0.78 | 0.78 | 0.78 | 0.78 |
| highly retractive weakly dispersing substances | 34.6 | 35.4 | 36.5 | 33.2 | 35.4 | 33.5 | 34.9 | 32.7 | 42.2 | 35.7 |
| strongly disp. substances | 0 | 0 | 0 | 3.1 | 0 | 0 | 0 | 6.8 | 3.2 | 0 |

|  | 11 | 12 | 13 | 14 | 15 | 16 | 17 | 18 | 19 |
|---|---|---|---|---|---|---|---|---|---|
| Si$_{1/2}$O | 43.7 | 51.2 | 50.2 | 48.6 | 43.2 | 50.3 | 49.4 | 50.8 | 49.6 |
| B$_{2/3}$O | 19.1 | 14.4 | 14.0 | 13.6 | 18.8 | 14.5 | 14.5 | 14.5 | 14.3 |
| MgO | — | — | — | — | — | — | — | — | — |
| CaO | — | — | — | — | — | — | — | — | — |
| SrO | — | — | — | — | — | — | — | — | — |
| BaO | 10.8 | 15.6 | 13.9 | 13.0 | 10.6 | 15.3 | 14.4 | 14.4 | 15.1 |
| PbO | — | — | — | — | — | — | — | 0.3 | — |
| ZnO | — | — | — | — | — | — | — | 0.3 | — |
| CaO | — | — | — | — | — | — | — | — | — |
| La$_{2/3}$O | 15.8 | 7.5 | 15.6 | 15.7 | 15.6 | 16.2 | 16.1 | 16.2 | 15.8 |
| Y$_{2/3}$O | 3.4 | 8.2 | — | — | — | — | — | — | — |
| Al$_{2/3}$O | — | — | — | — | — | — | — | — | — |
| Zr$_{1/2}$O | — | — | 6.3 | — | — | — | — | 0.5 | — |
| Ti$_{1/2}$O | — | — | — | 7.9 | — | — | — | — | 3.1 |
| Th$_{1/2}$O | 7.2 | 3.1 | — | 1.2 | 7.1 | 2.1 | 3.1 | 3.1 | 2.1 |
| Nb$_{2/5}$O | — | — | — | — | 4.7 | — | 2.5 | — | — |
| Ta$_{2/5}$O | — | — | — | — | — | — | — | — | — |
| W$_{1/3}$O | — | — | — | — | — | 1.6 | — | — | — |
| total | 100.0 | 100.0 | 100.0 | 100.0 | 100.0 | 100.0 | 100.0 | 100.0 | 100.0 |
| F$_2$–O | 6.2 | 9.4 | 9.0 | 9.0 | 6.2 | 15.2 | 14.4 | 14.4 | 15.0 |
| As$_2$O$_3$ (refining agent) | 0.3 | 0.3 | 0.3 | 0.3 | 0.3 | 0.3 | 0.3 | 0.3 | 0.3 |
| $\frac{Si_{1/2}O}{(Si_{1/2}O) + (B_{2/3}O)}$ | 0.70 | 0.78 | 0.78 | 0.78 | 0.70 | 0.78 | 0.77 | 0.78 | 0.78 |
| highly refractive weakly dispersing substances | 37.2 | 34.4 | 35.9 | 29.9 | 38.0 | 33.6 | 36.1 | 34.6 | 33.0 |
| strongly disp. substances | 0 | 0 | 0 | 7.9 | 0 | 1.6 | 0 | 0.3 | 3.1 |

TABLE 1-continued

[Compositions in Equivalent Percent]

|  | 20 | 21 | 22 | 23 | 24 | 25 | 26 | 27 | 28 |
|---|---|---|---|---|---|---|---|---|---|
| $Si_{1/2}O$ | 49.8 | 49.4 | 50.9 | 43.0 | 41.4 | 42.9 | 41.9 | 44.6 | 41.5 |
| $B_{2/3}O$ | 13.9 | 14.3 | 14.5 | 18.8 | 19.0 | 18.8 | 18.3 | 19.5 | 18.1 |
| MgO | — | — | — | — | — | — | — | — | — |
| CaO | — | — | — | — | — | — | — | — | — |
| SrO | — | — | 5.1 | — | — | — | — | — | — |
| BaO | 13.8 | 13.2 | 10.2 | 10.5 | 10.7 | 10.6 | 10.2 | 11.0 | 10.2 |
| PbO | — | — | — | — | — | 0.6 | — | — | — |
| ZnO | — | — | — | — | — | — | — | — | — |
| CaO | — | — | — | — | — | — | — | 5.2 | — |
| $La_{2/3}O$ | 15.5 | 16.0 | 16.3 | 17.9 | 18.1 | 17.8 | 13.5 | 12.3 | 11.6 |
| $Y_{2/3}O$ | — | — | — | — | — | — | — | — | — |
| $Al_{2/3}O$ | — | — | — | 1.0 | — | — | — | — | — |
| $Zr_{1/2}O$ | 5.9 | — | — | 0.5 | — | — | — | — | — |
| $Ti_{1/2}O$ | — | 5.0 | — | 0.8 | — | 3.2 | — | — | — |
| $Th_{1/2}O$ | 1.1 | 2.1 | 3.0 | 7.1 | 5.7 | 6.1 | 6.9 | 7.3 | 6.9 |
| $Nb_{2/5}O$ | — | — | — | — | 4.9 | — | 9.1 | — | — |
| $Ta_{2/5}O$ | — | — | — | — | — | — | — | — | — |
| $W_{1/3}O$ | — | — | — | — | — | — | — | — | — |
| total | 100.0 | 100.0 | 100.0 | 100.0 | 100.0 | 100.0 | 100.0 | 100.0 | 100.0 |
| $F_2$—O | 8.9 | 9.2 | 9.3 | 10.5 | 10.7 | 10.6 | 6.0 | 11.0 | 10.2 |
| $As_2O_3$ (refining agent) | 0.3 | 0.3 | 0.3 | 0.3 | 0.3 | 0.3 | 0.3 | 0.3 | 0.3 |
| $\dfrac{Si_{1/2}O}{(Si_{1/2}O)+(B_{2/3}O)}$ | 0.78 | 0.77 | 0.78 | 0.70 | 0.68 | 0.69 | 0.70 | 0.70 | 0.70 |
| highly refractive weak dispersing substances | 36.3 | 31.3 | 34.6 | 36.0 | 39.4 | 34.5 | 39.7 | 30.6 | 40.4 |
| strongly disp. subst. | 0 | 5.0 | 0 | 2.2 | 0 | 2.2 | 0 | 5.2 | 0 |

TABLE 2

[Compositions in Weight Percent]

|  | 1 | 2 | 3 | 4 | 5 | 6 | 7 | 8 | 9 | 10 |
|---|---|---|---|---|---|---|---|---|---|---|
| $SiO_2$ | 23.9 | 23.5 | 20.8 | 23.8 | 23.8 | 24.9 | 23.6 | 23.2 | 23.2 | 24.2 |
| $B_2O_3$ | 5.3 | 5.2 | 7.0 | 5.3 | 5.3 | 5.5 | 5.2 | 5.1 | 5.1 | 5.3 |
| MgO | — | — | — | 2.0 | — | — | — | — | — | — |
| CaO | — | — | — | — | — | — | — | — | — | — |
| SrO | — | — | — | — | 5.7 | — | — | — | — | — |
| BaO | 36.7 | 32.0 | 26.7 | 34.9 | 31.3 | 2.2 | 33.4 | 35.4 | 33.4 | 33.0 |
| PbO | — | — | — | — | — | — | — | 6.8 | 10.8 | — |
| ZnO | — | — | — | — | — | — | — | — | — | 6.6 |
| CdO | — | — | — | — | — | — | — | — | — | — |
| $La_2O_3$ | 27.7 | 28.6 | 31.1 | 27.7 | 27.6 | 26.4 | 23.1 | 3.4 | 21.4 | 24.5 |
| $Y_2O_3$ | — | — | — | — | — | — | — | — | — | — |
| $Al_2O_3$ | — | — | — | — | — | — | — | — | — | — |
| $ZrO_2$ | — | — | — | — | — | — | — | — | — | — |
| $TiO_2$ | — | — | — | — | — | — | — | — | — | — |
| $ThO_2$ | 6.4 | 10.5 | 15.0 | 6.3 | 6.3 | 11.0 | 14.7 | 6.1 | 6.1 | 6.4 |
| $Nb_2O_5$ | — | — | — | — | — | — | — | — | — | — |
| $Ta_2O_5$ | — | — | — | — | — | — | — | — | — | — |
| $WO_3$ | — | — | — | — | — | — | — | — | — | — |
| $F_2$-O | 5.3 | 4.6 | 3.7 | 5.4 | 5.3 | 4.6 | 4.8 | 2.9 | 2.9 | 3.1 |
| total | 105.3 | 104.6 | 103.7 | 105.4 | 105.3 | 104.6 | 104.8 | 102.9 | 102.9 | 103.1 |
| $As_2O_3$ (refining agent) | 0.3 | 0.3 | 0.3 | 0.3 | 0.3 | 0.3 | 0.3 | 0.3 | 0.3 | 0.3 |
| highly refractive weakly dispersing substances | 0.8 | 17.3 | 72.2 | 68.9 | 71.9 | 69.6 | 71.2 | 64.9 | 60.9 | 70.5 |
| strongly disp. subst. | 0 | 0 | 0 | 2.0 | 0 | 0 | 0 | 6.8 | 10.8 | 0 |
| $m_d$ | 7.6560 | 1.6764 | 1.6906 | 1.64683 | 1.65726 | 1.66801 | 1.67060 | 1.68076 | 1.68369 | 1.66480 |
| $y_d$ | 58.08 | 56.32 | 55.47 | 57.95 | 57.36 | 56.54 | 56.81 | 51.22 | 49.19 | 55.49 |
| $n_g$-$n_6$ | 0.5491 | 0.5502 | 0.5504 | 0.5405 | 0.5500 | 0.5518 | 0.5498 | 0.5590 | 0.5600 | 0.5508 |
| $n_f$-$n_C$ |  |  |  |  |  |  |  |  |  |  |
| $\dfrac{n_g\text{-}n_c}{n_f\text{-}n_C}$ | 1.0067 | 1.0102 | 1.0104 | 1.0091 | 1.0109 | 1.0119 | 1.0098 | 1.0216 | 1.2059 | 1.0110 |

|  | 11 | 12 | 13 | 14 | 15 | 16 | 17 | 18 | 19 |
|---|---|---|---|---|---|---|---|---|---|
| $NiO_2$ | 20.8 | 25.3 | 24.9 | 24.7 | 20.8 | 23.8 | 23.4 | 23.8 | 23.8 |
| $B_2O_3$ | 7.0 | 5.5 | 5.4 | 5.5 | 7.0 | 5.3 | 5.3 | 5.3 | 5.3 |
| MgO | — | — | — | — | — | — | — | — | — |
| CHO | — | — | — | — | — | — | — | — | — |
| SiO | — | — | — | — | — | — | — | — | — |
| BaO | 26.1 | 39.0 | 35.2 | 33.1 | 26.1 | 37.0 | 35.0 | 34.0 | 37.1 |
| PbO | — | — | — | — | — | — | — | 1.1 | — |
| ZnO | — | — | — | — | — | — | — | 0.5 | — |
| CnO | — | — | — | — | — | — | — | — | — |
| $Na_2O_3$ | 27.1 | 13.3 | 28.1 | 28.8 | 27.1 | 27.6 | 27.7 | 27.6 | 27.5 |
| $Y_2O_3$ | 4.0 | 10.1 | — | — | — | — | — | — | — |
| $Al_2O_3$ | — | — | — | — | — | — | — | — | — |
| $ZPO_2$ | — | — | 6.4 | — | — | — | — | 0.5 | — |
| $TiO_2$ | — | — | — | 5.3 | — | — | — | — | 2.0 |
| $ThO_2$ | 15.0 | 6.8 | — | 2.6 | 15.0 | 4.4 | 6.5 | 6.3 | 4.3 |
| $Nb_2O_5$ | — | — | — | — | 4.0 | — | 2.1 | — | — |
| $Ta_2O_5$ | — | — | — | — | — | — | — | — | — |
| $WO_3$ | — | — | — | — | — | 1.9 | — | — | — |
| $F_2$-O | 2.2 | 3.2 | 3.3 | 3.2 | 2.3 | 5.3 | 5.0 | 5.0 | 5.3 |
| total | 102.2 | 103.2 | 103.3 | 103.2 | 102.3 | 105.3 | 105.0 | 105.0 | 105.3 |
| $As_2O_3$ (refining agent) |  |  |  |  |  |  |  |  |  |
| highly refractive weak dispersing substances | 72.2 | 69.2 | 69.7 | 61.5 | 72.2 | 69.0 | 71.3 | 69.8 | 68.9 |
| strongly disp. subst. | 0 | 0 | 0 | 5.3 | 0 | 1.9 | 0 | 1.1 | 2.0 |

TABLE 2-continued
TABLE 2. [Compositions in Weight Percent]

| | | | | | | | | | |
|---|---|---|---|---|---|---|---|---|---|
| $n_d$ | 1.70571 | 1.65876 | 1.67777 | 1.69932 | 1.21580 | 1.66717 | 1.66350 | 1.65717 | 1.67727 |
| $v_d$ | 53.87 | 56.53 | 53.54 | 47.06 | 50.41 | 55.33 | 54.53 | 56.84 | 52.44 |
| $D_g$-$D_f$ | 0.5512 | 0.5500 | 0.5521 | 0.5666 | 0.5564 | 0.5529 | 0.5531 | 0.5500 | 0.5572 |
| $N_f$-$D_c$ | | | | | | | | | |
| $N_g$-$N_g$ | | | | | | | | | |
| $N_f$-$N_c$ | 1.0112 | 4.0099 | 1.0126 | 1.0314 | 1.0189 | 1.0137 | 1.0139 | 1.0298 | 1.0192 |

| | 20 | 21 | 22 | 23 | 24 | 25 | 26 | 27 | 28 | 29 |
|---|---|---|---|---|---|---|---|---|---|---|
| $SiO_2$ | 24.4 | 24.5 | 24.9 | 20.4 | 19.7 | 20.3 | 20.6 | 20.7 | 20.7 | 21.0 |
| $B_2O_3$ | 5.3 | 5.5 | 5.5 | 6.9 | 7.0 | 6.9 | 6.9 | 7.0 | 7.0 | 6.1 |
| MgO | — | — | — | — | — | — | — | — | — | — |
| $C_2O$ | — | — | — | — | — | — | — | — | — | — |
| SrO | — | — | 8.6 | — | — | — | — | — | — | — |
| BaO | 34.5 | 33.4 | 5.5 | 25.4 | 26.1 | 5.6 | 25.8 | 26.1 | 6.1 | 26.8 |
| PbO | — | — | — | — | — | — | — | — | — | — |
| ZnO | — | — | — | — | — | — | — | — | — | — |
| CdO | — | — | — | — | — | — | — | 10.4 | — | — |
| $La_2O_3$ | 27.5 | 28.7 | 28.9 | 30.5 | 31.1 | 30.5 | 23.9 | 20.8 | 20.8 | 30.4 |
| $Y_2O_3$ | — | — | — | — | — | — | — | — | — | — |
| $Al_2O_3$ | — | — | — | 0.5 | — | — | — | — | — | — |
| $ZrO_2$ | 6.0 | — | — | 0.5 | — | — | — | — | — | — |
| $TiO_2$ | — | 3.3 | — | 0.5 | — | 2.0 | — | — | — | — |
| $ThO_2$ | 2.3 | 4.6 | 6.6 | 14.8 | 11.9 | 12.7 | 14.9 | 15.0 | 15.0 | 0.2 |
| $Nb_2O_5$ | — | — | — | — | 4.2 | — | 7.9 | — | 10.14 | — |
| $Ta_2O_5$ | — | — | — | — | — | — | — | — | — | 5.5 |
| $WO_3$ | — | — | — | 0.5 | — | — | — | — | — | — |
| $F_2$-O | 3.2 | 3.3 | 3.2 | 3.6 | 3.7 | 3.7 | 2.2 | 3.7 | 3.7 | 5.6 |
| total | 103.2 | 103.3 | 103.2 | 103.6 | 103.7 | 103.7 | 102.2 | 103.7 | 103.7 | 05.6 |
| $As_2O_3$ (refining agent) | 0.3 | 0.3 | 0.3 | 0.3 | 0.3 | 0.3 | 0.3 | 0.3 | 0.3 | 0.3 |
| highly refractive weakly dispersing substances | 70.3 | 66.7 | 69.6 | 71.2 | 73.3 | 68.8 | 72.5 | 61.9 | 72.3 | 72.9 |
| strongly disp. substances | 0 | 3.3 | 0 | 1.5 | 0 | 4.0 | 0 | 10.4 | 0 | 0 |
| $n_d$ | 1.67621 | 1.68671 | 1.66573 | 1.69690 | 1.71202 | 1.70668 | 1.73292 | 1.70976 | 1.74243 | 1.68816 |
| $v_d$ | 53.92 | 50.72 | 56.42 | 53.61 | 50.60 | 50.05 | 46.71 | 51.66 | 44.58 | 53.76 |
| $n_g$-$n_F$ | 0.5513 | 0.5607 | 0.5501 | 0.5530 | 0.5571 | 0.559 | 0.5620 | 0.5546 | 0.5656 | 0.5531 |
| $n_g$-$n_e$ | | | | | | | | | | |
| $n_F$-$n_C$ | 1.0120 | 1.0238 | 1.0102 | 1.0139 | 1.0192 | 1.0227 | 1.0255 | 1.0160 | 1.0302 | 1.0142 |

Figure 2:
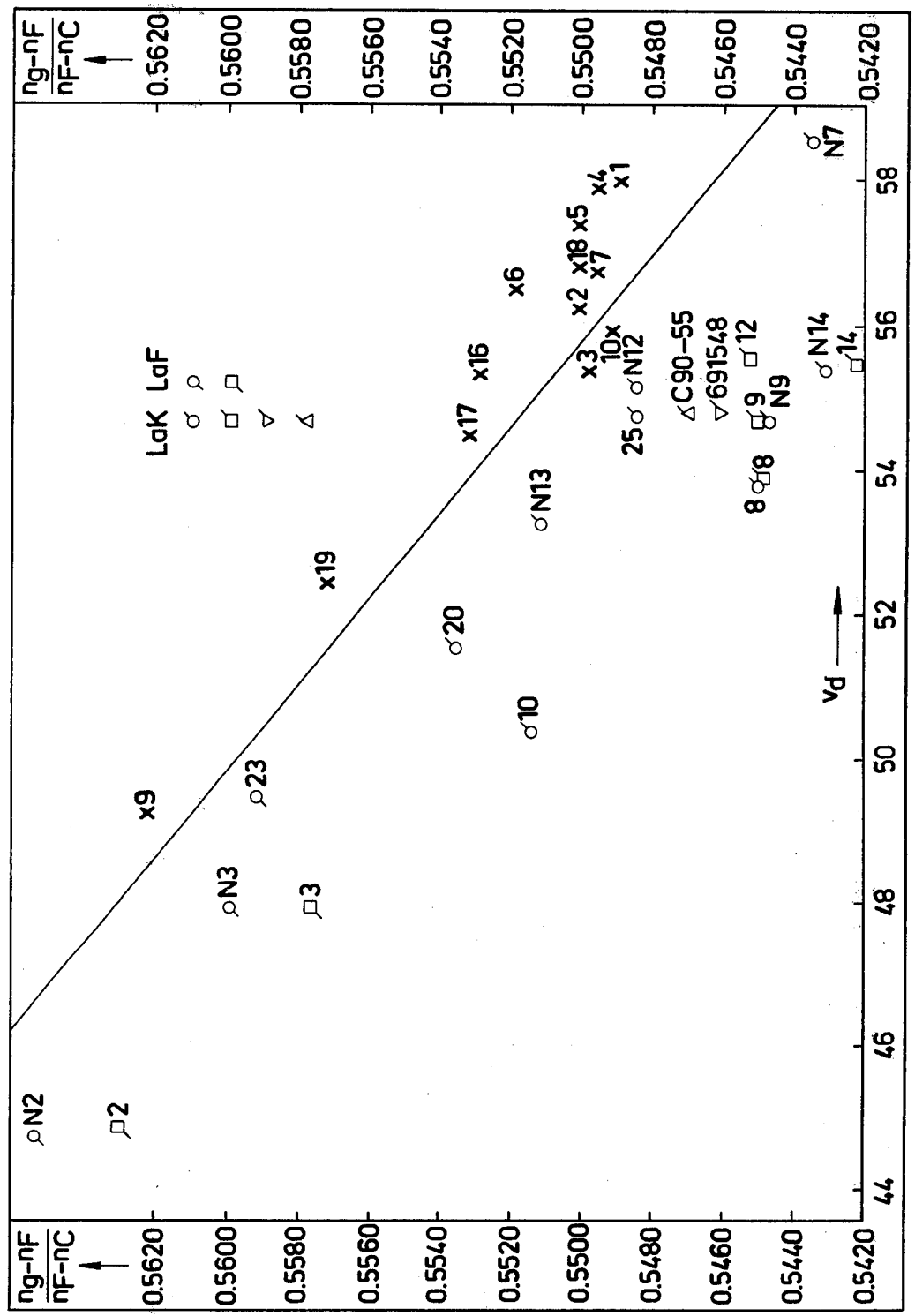

Reference is also made to the attached figures. FIG. 1 shows the optical positional range of the glasses in accordance with the invention. FIG. 2 shows the dependence of $(n_g - n_f)/(n_F - n_c) = P_{g,F}$ on $(n_d-1)/(n_F-n_C) = v_d$ of known glasses and of the glasses according to the invention. In FIG. 2, both glasses of this invention as well as glasses of the prior art have the same optical position, but the glasses of this invention are shown to exhibit higher partial dispersion $P_{g,F}$ than the prior art glasses. In these figures, the crosses indicate the glasses according to the inventon. The other markings correspond to commercial LaC and LaF glasses, which are to be found in the 1966 Schott catalogue and 1968 Min catalogue with the indicated numberings.

ILLUSTRATIVE EXAMPLES

The following examples are given by way of illustration of this invention only, and should not be construed as being in any way limiting upon the scope thereof. All percentages are by weight, unless specified to the contrary.

In the production of glass according to each of these examples, the following procedure was used.

The initial materials are well-mixed. The batch is melted at 1460° to 1480° C. in a platinum crucible and refined for two hours at 1520° C. Thereafter the temperature is lowered and stirring takes place from 1420° to 1030° C. The puring takes place at about 980° C. into a preheated casting mold. The reproducibility of the optical values is guaranteed by a melting assembly which is closed as tightly as possible, particularly so that the vaporization of the fluorine can be kept under control and influence the properties of the final melt product.

EXAMPLE 1

The following initial materials were used:

| | Weighed quantity for 4.6 kg. melt in grams |
|---|---|
| $SiO_2$ | 921.1 |
| $H_3BO_3$ | 549.6 |
| $BaF_2$ | 1329.1 |
| $La_2O_3$ | 1395.7 |
| $ThO_2$ | 668.3 |
| $As_2O_3$ | 13.8 | thus producing a charge for a 4.6 kg. melt having the following proportions:

| | Percent by Weight |
|---|---|
| $SiO_2$ | 20.75 |
| $B_2O_3$ | 7.00 |
| BaO | 26.08 |
| $La_2O_3$ | 31.12 |
| $ThO_2$ | 15.05 |
| Total Oxides: | 100.00 percent |
| $F_2$-O | 3.74 (increase in Weight due to oxygen replaced by fluorine) |
| $As_2O_3$ (refining agent) | 0.30 |

EXAMPLE 2

The following initial materials were used:

| | Weighed quantity for 4.6 kg. melt in grams |
|---|---|
| $SiO_2$ | 1133.6 |
| $H_3BO_3$ | 449.4 |
| $BaCO_3$ | 308.4 |
| $Ba(NO_3)_2$ | 394.5 |
| $BaF_2$ | 1228.2 |
| $La_2O_3$ | 1338.2 |
| $TiO_2$ | 244.8 |
| $ThO_2$ | 119.8 |
| $As_2O_3$ | 13.8 | thus producing a charge for a 4.6 kg. melt having the following proportions:

|  | Percent by Weight |
|---|---|
| SiO$_2$ | 24.6 |
| B$_2$O$_3$ | 5.3 |
| BaO | 33.5 |
| La$_2$O$_3$ | 28.8 |
| TiO$_2$ | 5.2 |
| ThO$_2$ | 2.6 |
| Total Oxides: | 100.0 |
| F$_2$-O | 3.3 |
| Overall Total: | 103.3 |
| As$_2$O$_3$ (refining agent): | 0.3 |

Having now discussed in considerable detail illustrative and preferred embodiments of the invention, it should be apparent that the objects set forth at the outset of this specification have been satisfied.

Accordingly, what is claimed is:

1. Optical glasses containing barium borosilicate having a varying partial dispersion $P_{g,F} = (n_g - n_F)/(n_F - n_C)$ in the optical positional range of lanthanum crown and lanthanum flint glasses having an index of refraction of about 1.642 to 1.742 and $v_d$ of about 44.0 to 58.0 and wherein the amount of SiO$_2$ present in the glass satisfies the following condition:

$$\frac{[Si_1O]}{[Si_1O] + [B_1O]}$$

is at least 0.62 and the content of fluorine in said glass is at least 7 grams per 100 cc. of said glass consisting essentially of:

|  | weight percent |
|---|---|
| SiO$_2$ | 20 to 26 |
| B$_2$O$_3$ | 3 to 8 |
| BaO | 20 to 38 |
| MgO | 0 to 6 |
| CaO | 0 to 18 |
| SrO | 0 to 18 |
| La$_2$O$_3$ | 20 to 32 |
| Y$_2$O$_3$ | 0 to 25 |
| ThO$_2$ | 0 to 18 | and up to 12 equivalent percent of one or more of the following ingredients to adjust the required $n_d$ and $v_d$ values: ZnO, PbO, CdO, TiO$_2$, ZrO$_2$, Nb$_2$O$_5$, Ta$_2$O$_5$, WO$_3$, MO$_3$ and mixtures thereof.

2. Optical glass according to claim 1 consisting essentially of:

|  | weight percent |
|---|---|
| SiO$_2$ and B$_2$O$_3$ | 26 to 31 |
| BaO + MgO + CaO + SrO | 25 to 40 |
| La$_2$O$_3$ + Y$_2$O$_3$ + ThO$_2$ | 20 to 32 |

3. Optical glass of claim 1 comprising 60 percent by weight of highly refracting, weakly or moderately dispersing materials selected from the group consisting of La$_2$O$_3$, ThO$_2$, ZrO$_2$, BaO, SrO, CaO, ZnO, Ta$_2$O$_5$, Nb$_2$O$_5$ and mixtures thereof.

4. Optical glass of claim 3 wherein Y$_2$O$_3$ is added to the composition to substitute an equal amount of La$_2$O$_3$.

5. Optical glass of claim 4 wherein up to 25 weight percent of said La$_2$O$_3$ is substituted with Y$_2$O$_3$.

6. Optical glass of claim 5 further containing a strong dispersing material selected from the group consisting of MgO, PbO, CdO, Al$_2$O$_3$, TiO$_2$, WO$_3$ and mixtures thereof, in an amount sufficient to adjust the required optical position and crystallization stability of said glass.

7. Optical glass of claim 3 further containing a strong dispersing material selected from the group consisting of MgO, PbO, CdO, Al$_2$O$_3$, TiO$_2$, WO$_3$ and mixtures thereof, in an amount sufficient to adjust the required optical position and crystallization stability of said glass.

8. Optical glass according to claim 1 comprising:

|  | weight percent |
|---|---|
| SiO$_2$ | 20 to 26 |
| B$_2$O$_3$ | 2 to 8 |
| BaO | 20 to 38 |
| La$_2$O$_3$ | 20 to 32 |
| ThO$_2$ | 0 to 18 |
| F$_2$-O | 2 to 7 | and wherein the total amount of SiO$_2$ and B$_2$O$_3$ present in the composition is between 26 and 31 weight percent.

9. Optical glass of claim 1 further containing the following strongly dispersing ingredients:

|  | weight percent |
|---|---|
| CdO | 0 to 8 |
| PbO | 0 to 10 |
| Al$_2$O$_3$ | 0 to 7 |
| TiO$_2$ | 0 to 8 |
| WO$_3$ | 0 to 7 | wherein the total amount of said ingredients present in said glass is no greater than 8 equivalent percent.

10. Optical glass of claim 1 comprising the following materials:

|  | weight percent |
|---|---|
| SiO$_2$ | 20.75 |
| B$_2$O$_3$ | 7.00 |
| BaO | 26.08 |
| La$_2$O$_3$ | 31.12 |
| ThO$_2$ | 15.05 | and 3.74 weight percent of F$_2$-O based upon the total weight of oxides present in said glass.

11. Optical glass of claim 1 comprising the following materials:

|  | weight percent |
|---|---|
| SiO$_2$ | 24.6 |
| B$_2$O$_3$ | 5.3 |
| BaO | 33.5 |
| La$_2$O$_3$ | 28.8 |
| TiO$_2$ | 5.2 |
| ThO$_2$ | 2.6 | and 3.3 weight percent of F$_2$-O based upon the total weight of oxides present in said glass.

12. Optical glass of claim 1 containing 2 to 7 weight percent of F$_2$-O based upon the total weight of oxides present in said glass.

* * * * *